O. SHEEHAN.
MACHINE FOR DECORTICATING FIBROUS SUBSTANCES.
APPLICATION FILED FEB. 4, 1910.
1,098,180.
Patented May 26, 1914.
2 SHEETS—SHEET 2.
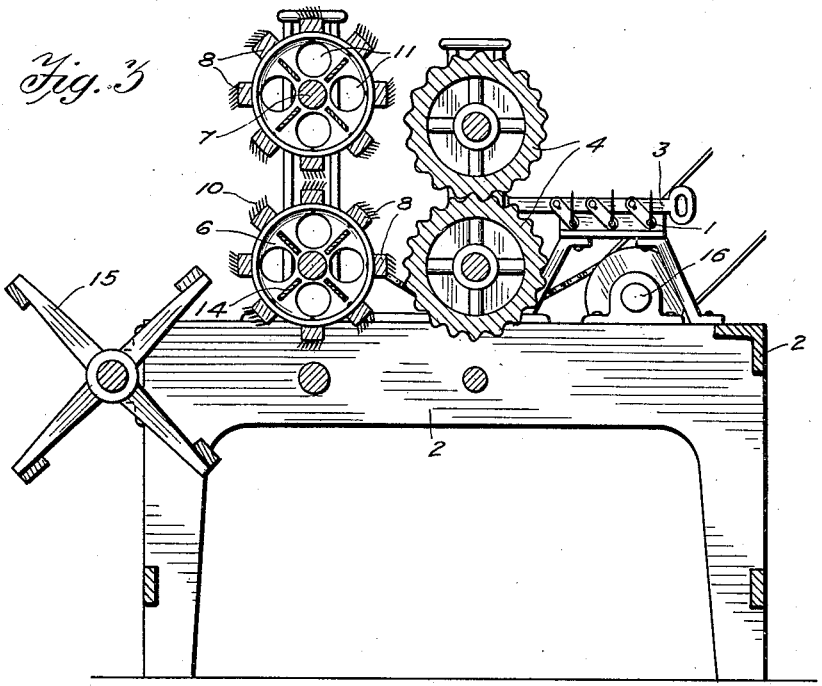
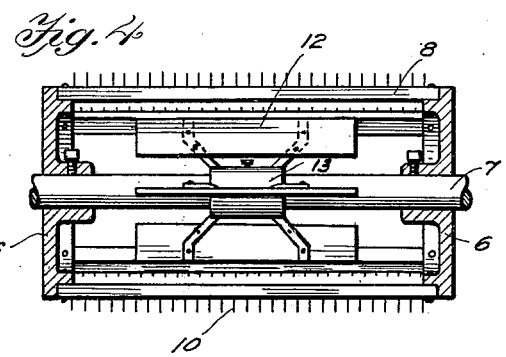
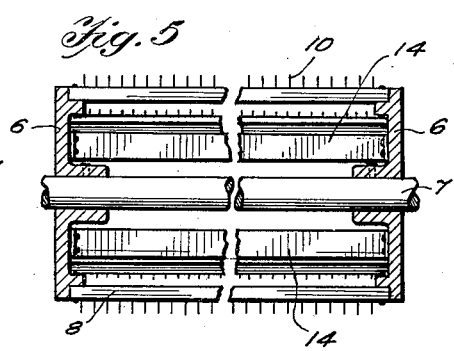
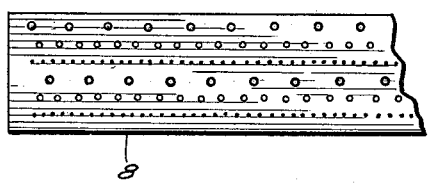
Witnesses
R. C. Claflin
M. E. Shook
Inventor
Owen Sheehan
By Edson Bro's
Attorneys

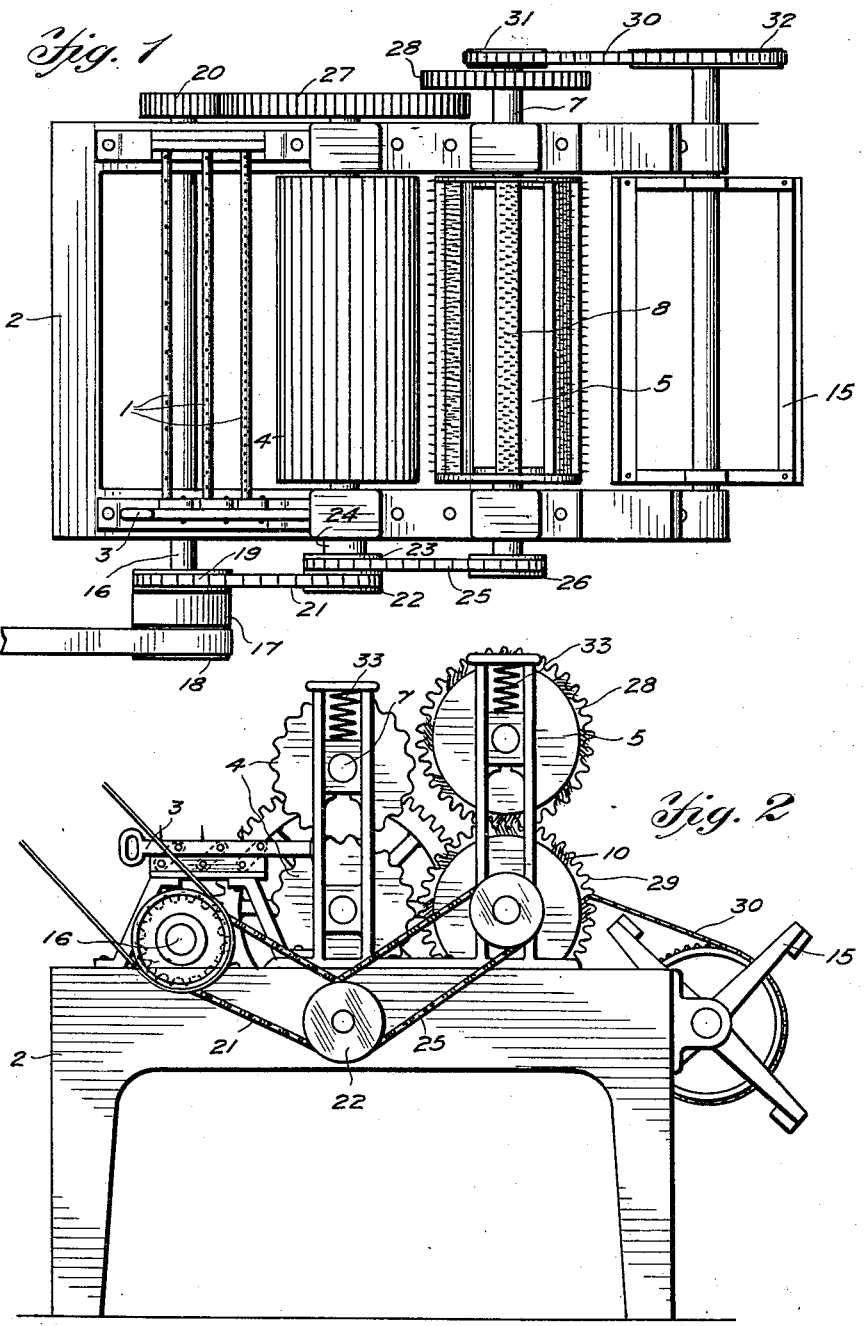

UNITED STATES PATENT OFFICE.

OWEN SHEEHAN, OF NEW BEDFORD, MASSACHUSETTS, ASSIGNOR TO HOLLINGSWORTH AND VOSE COMPANY, OF BOSTON, MASSACHUSETTS, A CORPORATION OF MASSACHUSETTS.

MACHINE FOR DECORTICATING FIBROUS SUBSTANCES.

1,098,180.  Specification of Letters Patent.  Patented May 26, 1914.

Application filed February 4, 1910. Serial No. 542,061.

*To all whom it may concern:*

Be it known that I, OWEN SHEEHAN, a citizen of the United States, residing at New Bedford, in the county of Bristol and State of Massachusetts, have invented certain new and useful Improvements in Machines for Decorticating Fibrous Substances; and I do hereby declare the following to be a full, clear, and exact description of the invention, such as will enable others skilled in the art to which it appertains to make and use the same.

My invention relates to decorticating machines for disintegrating and cleaning fiber from fibrous plants.

The principal object of the present invention is to render it unnecessary to stop the machine every little while to remove the pulpy matter which soon collects between the teeth on cleaning rolls of the construction heretofore used. It has been the custom to make these cleaning rolls in the form of a closed drum in which the cleaning teeth are fixed. When so made, the pulpy matter which is cut from the plants very soon collects upon the rolls and rapidly forms a hard caked mass filling the spaces between the teeth, thereby impairing the usefulness of said rolls and sometimes rendering them entirely useless. The only way to avoid the output of an inferior product with machines equipped with this old style of cleaning rolls is to repeatedly stop the machine and clean the pulpy matter from between the teeth which consumes a material part of a day's working time during which the machine might be running if this cleaning of the rolls were not necessary. Even with repeated stops for cleaning, the machine does not produce a very high class product because said rolls cannot run for any length of time after they have been cleaned before the mass of pulpy matter begins to collect thereon, and this mass, becoming thicker, gradually decreases the effectiveness of the action of the teeth upon the material passing between said rolls until the machine is stopped again for another cleaning.

The improved form of cleaning rolls hereinafter described is self-cleaning so that the delays for cleaning said rolls, just referred to, are not required when the machine is provided with my rolls. The result is that the output of the machine is greatly increased and, what is more important, said output is a much finer grade than it has heretofore been possible to produce.

The present invention has for its object, in common with my former invention, covered by the application to which I have alluded, to roll, knead, cut, and otherwise separate the fiber from the pith, pulp and cellular matter in such a manner that the entire fiber will be delivered from the machine with its full length and strength.

The invention consists primarily in constructing the clearing rolls with apertured heads and spaced apart lags bearing the cleaning teeth. The rotation of these drums causes air to be drawn in through the openings in the heads and expelled through the spaces between the lags by centrifugal force, thus preventing the pulpy matter from collecting on said lags. If found necessary or desirable, a fan may be arranged inside of the roll to increase the blast of air which passes out through the open spaces between the lags. The upper and lower cleaning rolls of a pair are geared together with open spur or star gears which allow the upper roll to rise the required distance to permit the fiber to pass below it without bringing said gears out of mesh.

Each lag of the cleaning rolls is provided with a plurality of rows of sharp teeth projecting at an angle away from the direction of movement of said rolls. The several rows of teeth on each lag are staggered or arranged at different intervals to suit the size and constituency of the fibrous material to be decorticated. Thus, the teeth may be placed farther apart for coarse work and at closer intervals for fine work. The lags are interchangeable for the same purpose, and the rolls may also be changed if necessary.

The invention also consists in the features of construction and combinations of parts hereinafter described and specified in the claims.

In the accompanying drawings illustrating the preferred embodiment of my invention: Figure 1 is a plan view of a machine constructed in accordance with my pending application filed November 19, 1907, Serial No. 402,862, except that it is equipped with my new form of cleaning rolls. Fig. 2 is a side elevation. Fig. 3 is a central vertical section taken from end to end of the machine.

Fig. 4 is a detailed section of one of the cleaning rolls. Fig. 5 is a similar view showing a modified form of fan, and Fig. 6 is a detailed view of one of the lags of the cleaning rolls.

In carrying out my invention, I employ toothed bars 1 suitably mounted on one end of the supporting frame 2 of the machine and adjustable by means of the hand lever 3 whereby the teeth on said bars may be brought to either a horizontal or vertical position or to any intermediate angle. These toothed bars are designed to split the leaves, bark, etc., as more fully explained in my previous application above referred to, preparatory to the cutting away of the pulpy matter by the cleaning rolls.

Pairs of fluted draft rolls 4 and cleaning rolls 5 are arranged in succession, the draft rolls being placed between the combs or toothed bars and the cleaning rolls. Each of said cleaning rolls comprises two disk shaped heads 6, suitably keyed or secured to revolve with the shaft 7, and spaced apart lags 8 bolted or otherwise secured to flanges 9 on said heads. Each of the lags is provided with one or more rows of teeth 10 which are preferably inclined away from the direction of movement of the roll. Apertures 11 are formed in each of the heads or end plates and extend inward near to the shaft.

I prefer to use from six to eight rows of teeth on each lag but more may be added, if desired. Each one of every three rows differs from the others in the size of the teeth and their spacing. Thus, some coarse and some finer teeth are used and those in each row are spaced differently from those in the rows at either side thereof, whereby there is no possibility of a small filament of fiber escaping without being thoroughly cleansed or decorticated. There are from six hundred to one thousand teeth in each lag. The various arrangements, such as the dimensions of the rolls and teeth and the placing of said teeth must, of course, be determined in view of the particular work required.

The fan, which may be arranged interiorly of the roll, is preferably composed of a series of radial blades 12 extending longitudinally of said roll and mounted on a sleeve 13 separately secured to the shaft 7, as illustrated in Fig. 4. If preferred, the fan may consist of separate blades or strips 14 extending throughout the length of the roll and secured to the end plates or heads, as illustrated in Fig. 5. A clearing reel or "take off" 15 is mounted at the other end of the machine from where the combs are located. Said reel is adapted to revolve at sufficient speed to take the fiber from the cleaning rolls and lay it on the floor.

The driving shaft 16 carries fast and loose pulleys 17 and 18, a sprocket wheel 19 on one side of the framework of the machine and a gear wheel 20 on the other side of said frame. A chain 21 connects the sprocket wheel 19 with one of a pair of sprocket wheels 22 and 23 removably mounted on a stud 24 on the frame. The other one of said pair of sprocket wheels is connected by a chain 25 with a sprocket wheel 26 on the shaft of the lower cleaning roll. The sprockets 22 and 23 on the stud may be removed and others of different size substituted therefor when it is desired to vary the speed of said cleaning rolls. The gear wheel 20 on the other side of the machine meshes with an idle gear $27^a$ which drives the gear wheel 27 on the shaft of the lower fluted or draft roll.

The upper cleaning roll is driven by means of the pair of open spur or star gears 28 and 29, the former of which is mounted on the shaft of said roll, while the latter is similarly mounted on the shaft of the lower cleaning roll. By reason of the length of the spurs or teeth on said star gears and the large spaces between them, the upper roll may be raised some distance above the lower one by the material passing between them without disconnecting said gears. The delivery reel is driven by a chain 30 passing around sprockets 31 and 32 mounted respectively on the shafts of the lower cleaning roll and said reel.

It will be understood that the pairs of draft rolls and cleaning rolls are journaled as usual, the journals of the lower roll of each pair being fixed, while the journals of the upper rolls are vertically movable and cushioned by springs 33 normally holding them in their lowest positions. It may be noted further with reference to the gears 28 and 29 that, when they are normally in closest contact, they hold the cleaning rolls far enough apart to prevent the fine teeth on the lags of said rolls from striking one another and being injured. These gears insure the continuous operation of the cleaning rolls even if the latter are lifted apart at one end by the material passing between them.

I claim:

1. A fiber cleaning roll for decorticating machines comprising a rotatable cylindrical casing having apertured end plate and regularly spaced longitudinal slots of uniform width in its peripheral surface, and fan blades arranged interiorly of the casing to revolve therewith, whereby a uniform blast of air is discharged through the slots in its periphery all around for dislodging fiber and waste matter having a tendency to cling to the roll.

2. A fiber cleaning roll for decorticating machines comprising a rotatable cylindrical casing having apertured end plates and regularly spaced longitudinal strips secured to the peripheries of said end plates, and fan blades arranged interiorly of the casing to revolve therewith.

3. In a machine of the character described, a pair of cleaning rolls, each comprising a revoluble casing having apertured heads and spaced apart lags equipped with teeth, a fan arranged in each row to turn therewith, and means for revolving the rolls toward one another, the teeth of the corresponding lags of the two rolls being adapted to simultaneously engage the opposite sides of the material operated upon.

4. In a machine of the character described, a pair of cleaning rolls, each comprising a revoluble casing having apertured heads and spaced apart lags equipped with teeth, a fan arranged in each row to turn therewith, and means for revolving the rolls toward one another, the teeth of the corresponding lags of the two rolls being adapted to simultaneously engage the opposite sides of the material operated upon, said rolls being spaced apart so that their teeth do not mesh, all for the purposes specified.

In testimony whereof, I affix my signature, in presence of two witnesses.

OWEN SHEEHAN.

Witnesses:
 MARY E. BOWDEN,
 MINNA B. WILLIAMS.

Copies of this patent may be obtained for five cents each, by addressing the "Commissioner of Patents, Washington, D. C."